(12) United States Patent
Shelton

(10) Patent No.: US 7,276,677 B1
(45) Date of Patent: Oct. 2, 2007

(54) PRESSURE COOKING VESSEL

(75) Inventor: Winston Shelton, Louisville, KY (US)

(73) Assignee: Carton Drive Enterprises LLC, Louisville, KY (US)

( * ) Notice: Subject to any disclaimer, the term of this patent is extended or adjusted under 35 U.S.C. 154(b) by 56 days.

(21) Appl. No.: 11/102,534

(22) Filed: Apr. 8, 2005

(51) Int. Cl.
A47J 27/08 (2006.01)
A47J 37/12 (2006.01)

(52) U.S. Cl. .................. 219/440; 219/439; 99/403; 99/410; 99/418; 126/373.1; 126/390.1

(58) Field of Classification Search .............. None
See application file for complete search history.

(56) References Cited

U.S. PATENT DOCUMENTS 1,936,164 A    11/1933  Jarvis
3,618,587 A *  11/1971  Lee, Sr. .................. 219/431
3,677,170 A     7/1972  Shelton et al.
3,821,925 A *   7/1974  Moore ..................... 99/336
4,273,991 A     6/1981  Barnhill
4,296,310 A *  10/1981  Luebke et al. ............ 219/440
4,968,516 A *  11/1990  Thompson ................ 99/330
5,582,296 A    12/1996  Beauchamp et al.
5,635,234 A     6/1997  Svensson
5,721,001 A *   2/1998  Ishikura et al. ........... 99/410
6,336,395 B1 *  1/2002  Tiszai ..................... 99/336
6,820,536 B2 * 11/2004  Kijimoto ................. 99/330

* cited by examiner

Primary Examiner—J. Pelham
(74) Attorney, Agent, or Firm—James C. Eaves, Jr.; Greenebaum Doll & McDonald PLLC

(57) ABSTRACT

A pressure cooking vessel using a cylindrical cooking chamber and rectangular food racks. This combination allows one to enjoy the benefits of using a cylindrical chamber to pressure cook along with the benefits of using rectangular racks to display the food.

19 Claims, 7 Drawing Sheets

PRESSURE COOKING VESSEL

BACKGROUND

In the fried food industry, it is common to use a pressurized cooking vessel, such as a pressure fryer, to prepare products such as fried chicken, fish, or the like. The advantage of using a pressurized vessel is that it significantly reduces cooking time while providing a moist and tender product.

The typical operation of a pressure fryer may be summarized as follows: (1) fill the fryer with shortening; (2) raise the temperature of the shortening to a specific point through internal heating elements; (3) place food on wire cooking racks; (4) place the wire cooking racks with food in the fryer; (5) close the lid on the fryer; (6) heat the shortening, raising the pressure and cooking the food; (7) remove racks with fried food from the vessel; (8) drain; (9) remove the fried food from the cooking racks and place it on display racks; and (10) display fried food for consumers.

BRIEF SUMMARY

The embodiments that are shown and described herein combine a cylindrical cooking chamber with rectangular wire racks. This combination optimizes the structural integrity of the pressure cooking vessel, and it allows the same rack to be used both for cooking the food and for displaying the food, thereby eliminating the labor required to move the food from a cooking rack to a display rack and minimizing the risk of food contamination that occurs whenever food is handled.

A cylindrical shape is preferred over a rectangular shape in order to provide superior structural strength to withstand the internal pressure.

In one embodiment, the heating elements project into opposite sides of the vessel, allowing for good surface contact between the heating elements and the shortening.

Another feature of one embodiment of the invention is a pair of draining bars located near the top of the cooking vessel. The draining bars temporarily support the rectangular rack after it is removed from the vessel so that the shortening on the food can drain back into the vessel. The rectangular rack is simply lifted, rotated 90 degrees, and then placed on the draining bars.

DETAILED DESCRIPTION OF THE PREFERRED EMBODIMENTS

Figure 1:
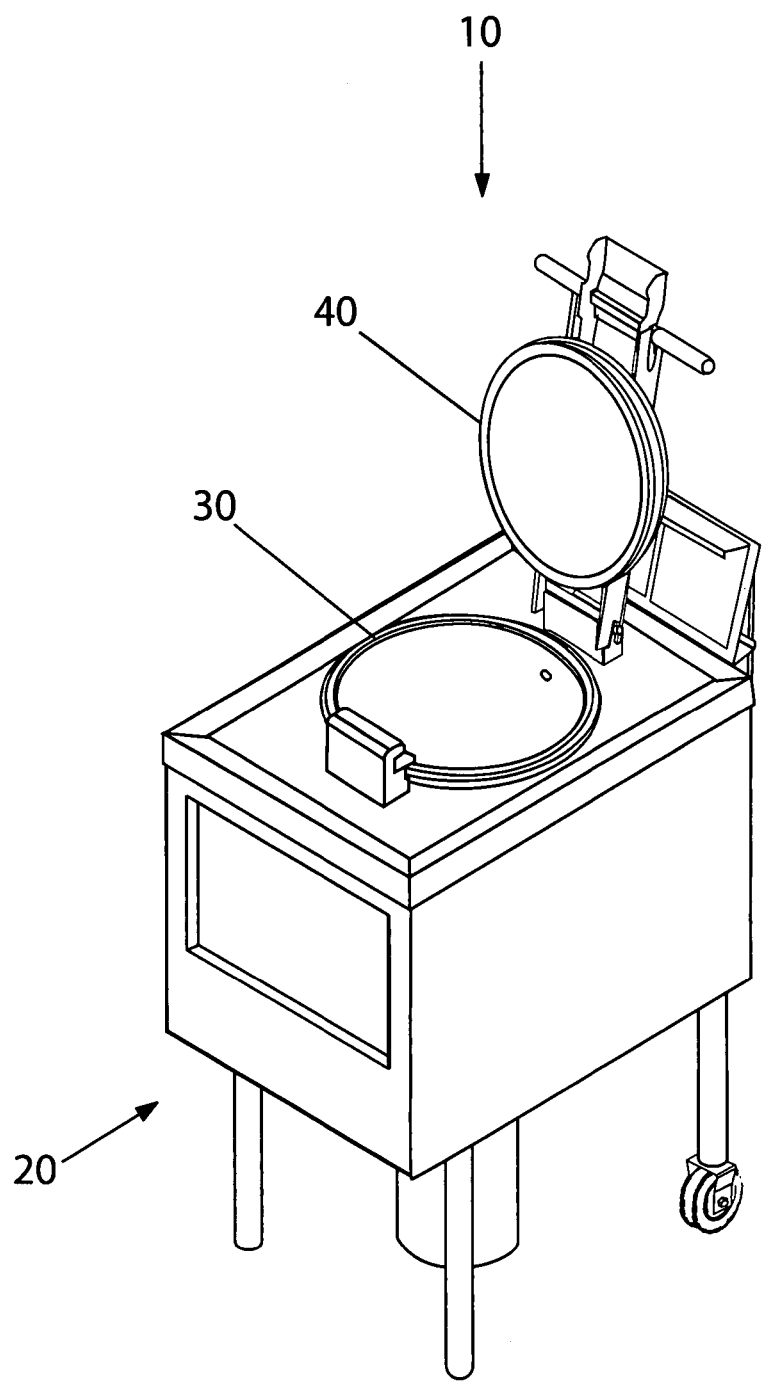
FIG. 1 is a perspective view of one embodiment of a pressure cooking vessel made in accordance with the present invention.
Figure 2:
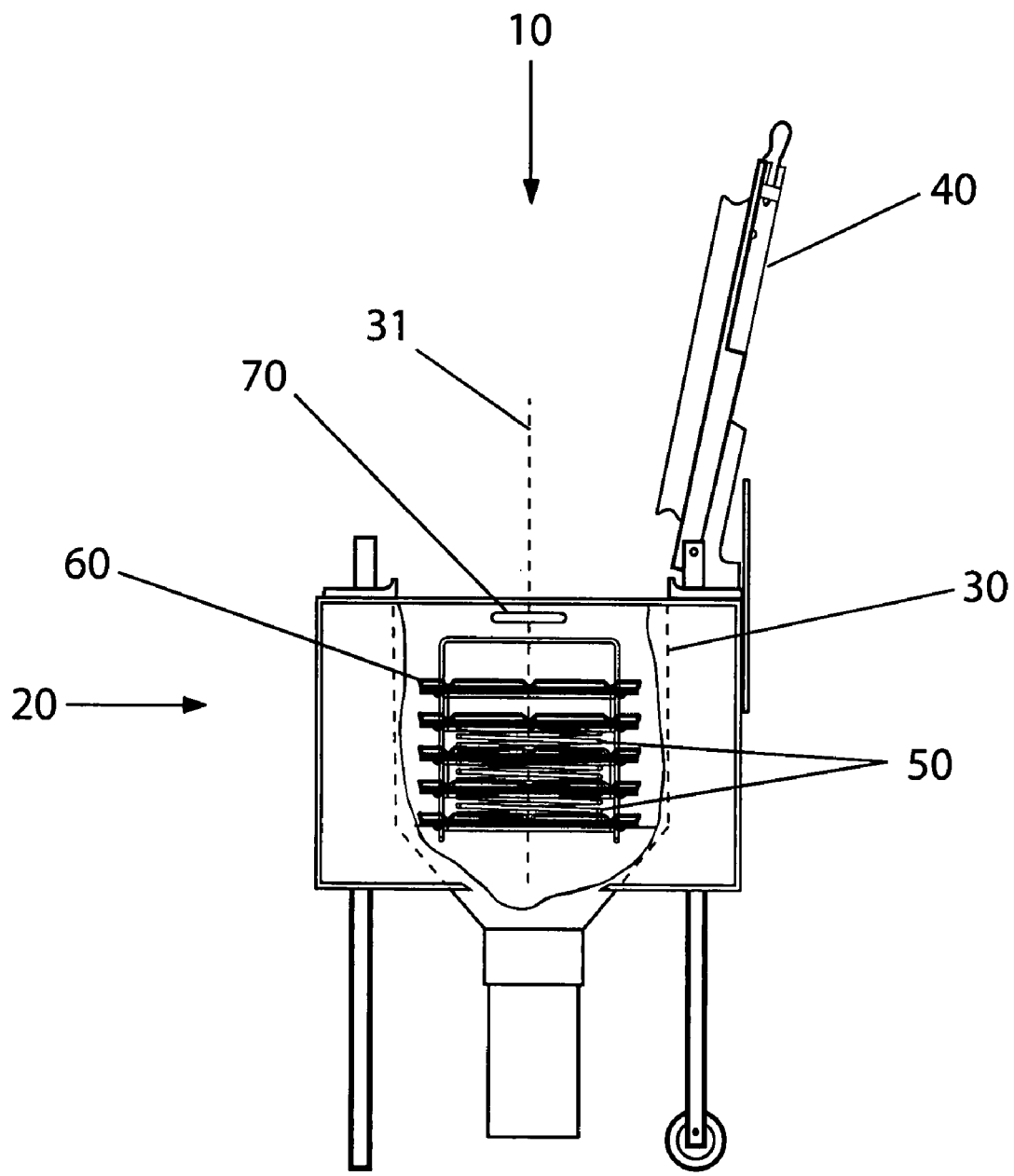
FIG. 2 is a broken-away side view of the pressure cooking vessel of FIG. 1.
Figure 2A:
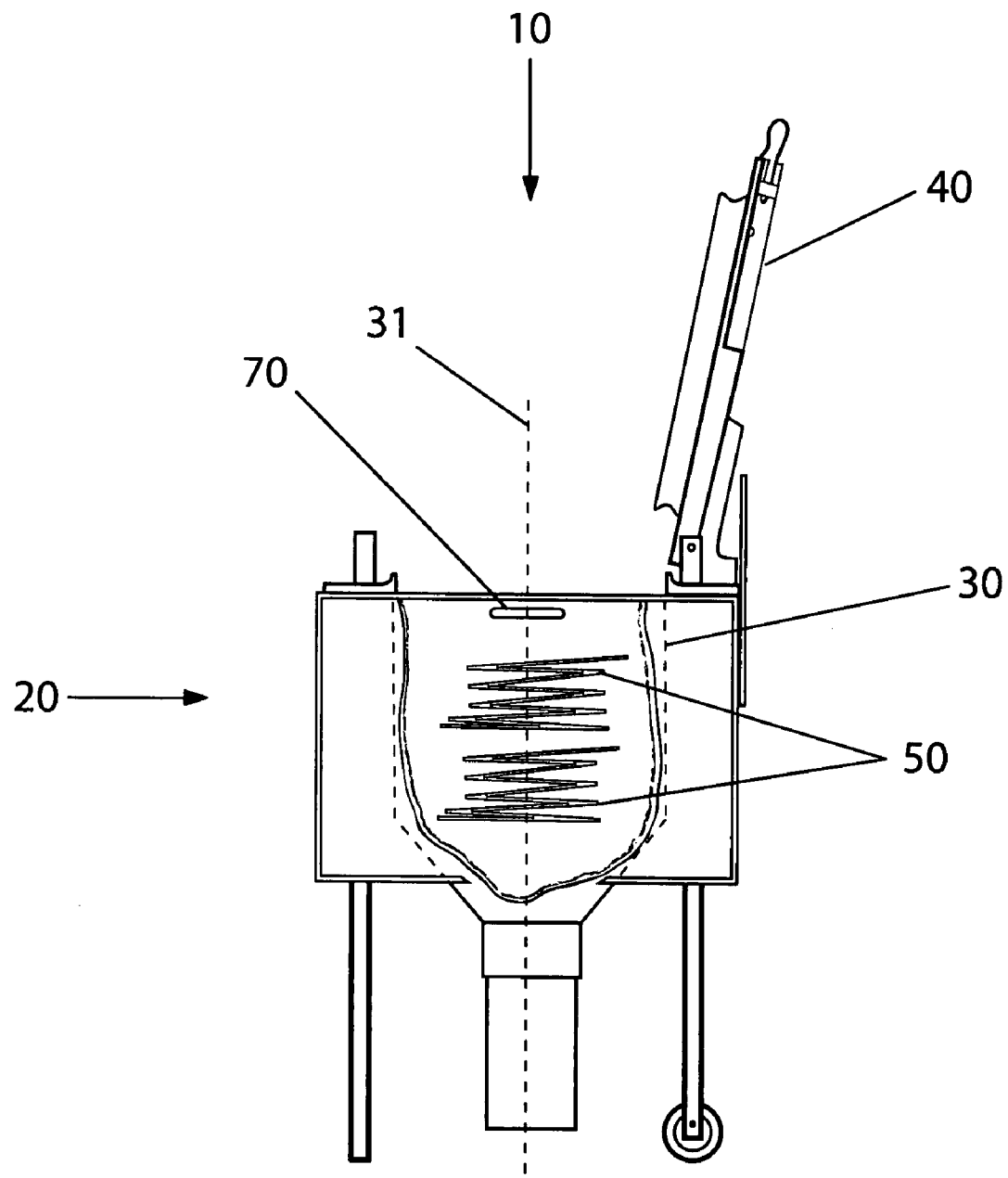
FIG. 2A is a broken-away side view of the pressure cooking vessel of FIG. 1 with the rectangular rack removed for clarity.
Figure 3:
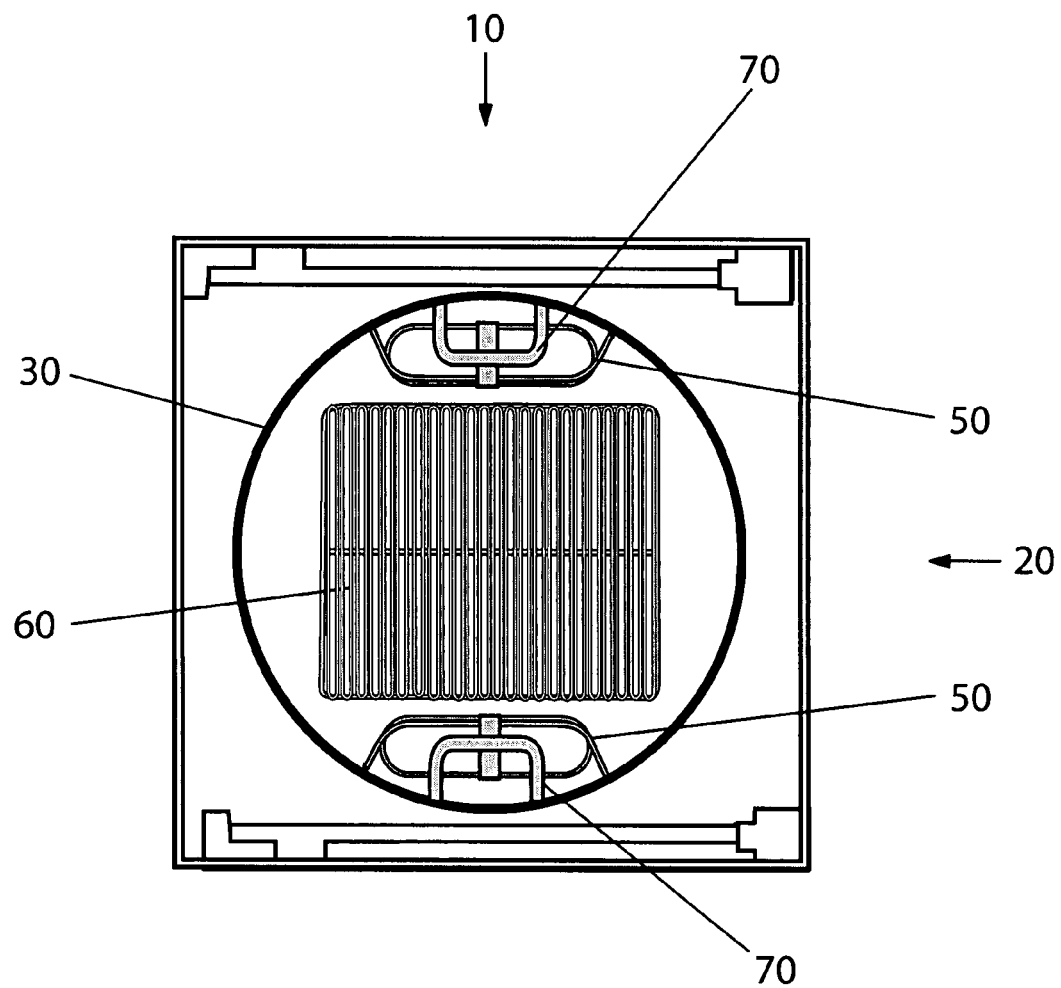
FIG. 3 is a top view of the pressure cooking vessel of FIG. 1 with the lid removed for clarity.

FIGS. 1, 2 and 3 show one embodiment of a pressure cooking vessel 10 made in accordance with the present invention. As best shown in FIG. 2, the pressure cooking vessel 10 includes a housing 20 with a wall defining a cylindrical chamber 30 with a central vertical axis 31. The cylindrical chamber 30 has a closed bottom and an open top. It also includes a lid assembly 40, which is hinged to the housing 20 and encloses the open top.

The cylindrical chamber 30 contains heating elements 50. As best shown in FIG. 3, the heating elements 50 are positioned on opposing sides of the central vertical axis 31 of the cylindrical chamber 30. The heating elements 50 are strategically placed so that a rectangular rack 60, i.e. a rack that has a rectangular cross-section in the horizontal plane, may be placed between the heating elements 50. This design provides the benefits of using a cylindrical chamber and the benefits of using a rectangular rack without wasting space.

In one embodiment, the center of the rectangular cross-section of the rectangular rack 60 shares the central vertical axis 31 of the cylindrical chamber 30. The rectangular rack 60 has two long opposing sides and two short opposing sides, and the heating elements 50 are positioned between the long sides of the rectangular rack 60 and the wall of the cylindrical chamber 30. The heating elements 50 are designed for a three phase system, with one phase on one side of the long side of the rectangular rack 60, the second phase on the other side of the long side of the rectangular rack 60, and the third phase having heating elements 50 on both sides, below the first and second phase heaters.

In typical operation, the cylindrical chamber 30 is filled with shortening (not shown). The shortening is heated to the desired cooking temperature by the heating elements 50. Then, uncooked food is placed in the rectangular rack 60, and the rack 60 is placed inside the cylindrical chamber 30. The lid assembly 40 is closed. The heating elements 50 continue heating the shortening, pressure develops in the chamber 30, and the food is cooked. After the food has cooked for a predetermined length of time, the pressure is reduced to atmospheric pressure, the lid 40 is opened, the rack 60 is removed from the cylindrical chamber 30, and the shortening is allowed to drain from the food. Then, the rack 60 is moved to a separate location, where the food is displayed for consumers, such as into a rectangular display case (not shown), which receives the rectangular rack 60.

In one embodiment, draining bars 70 are attached to the walls of the cylindrical chamber 30 on the same opposing sides as the heating elements 50. As best shown in FIG. 3, the draining bars 70 are generally U-shaped and project inwardly. As best shown in FIG. 2, the bars 70 are positioned near the top of the cylindrical chamber 30 and above the heating elements 50. The draining bars 70 provide a simple and effective means to facilitate the drainage of shortening back into the cylindrical chamber 30 after cooking. Once the rectangular rack 60 is removed from the cylindrical chamber 30, the rack is merely rotated ninety degrees and is then placed on top of the draining bars 70. The technique is less complicated than using a supplemental hook arrangement or similar device to hang the racks, and it involves less effort than manually holding the rack while it drains. The technique is also very clean because the entire cross-sectional area of the rack 60 is encircled by the cross-sectional area of the chamber 30. Therefore, all the shortening that drips from the food falls directly into the chamber 30.

Figure 4:
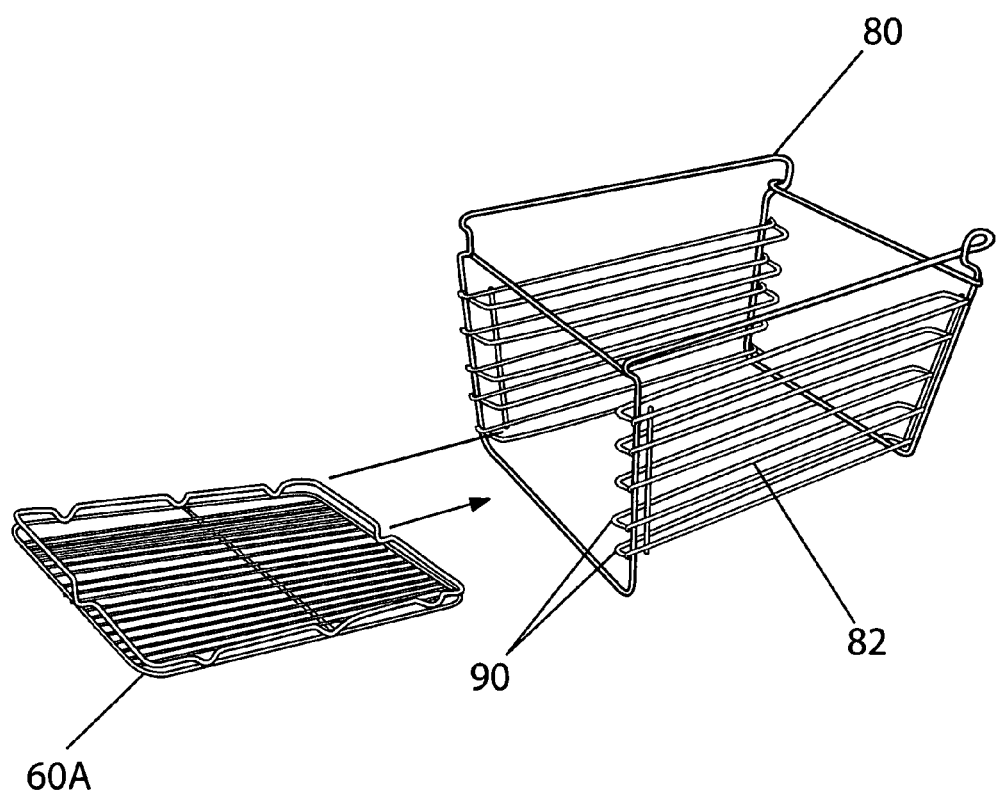
FIG. 4 is a perspective view of the rectangular rack of FIG. 2.
Figure 5:
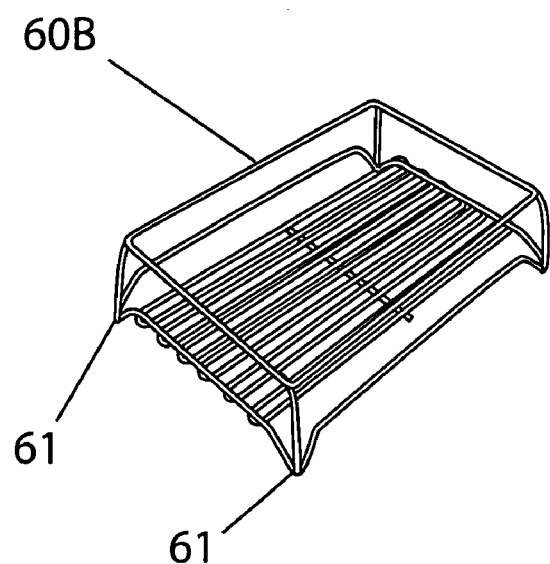
FIG. 5 is a perspective view of another embodiment of a rectangular rack, which is made up of stacked rack elements, that could be used instead of the rack of FIG. 4.
Figure 6:
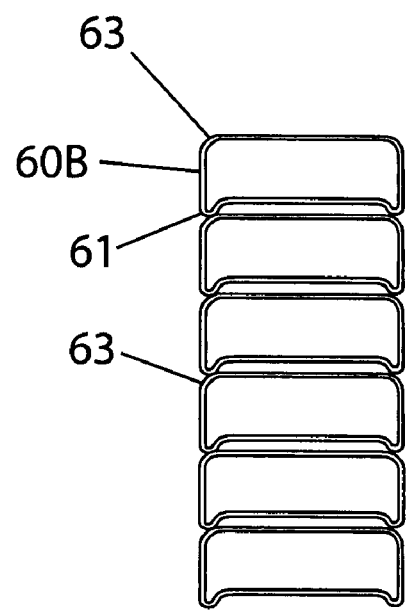
FIG. 6 is a front view of the rectangular rack shown in FIG. 5.

FIGS. 4, 5 and 6 show two different embodiments of rectangular racks that may be used with the pressure cooking vessel 10. The first embodiment is shown in FIG. 4. In this case, horizontal rack elements 60A are slid into a frame 80. The frame 80 is constructed so that it has a front, back, top, bottom, and two sides. The sides have inwardly protruding rails 82, and the front is open. The horizontal rack elements 60A rest on the rails 82 and may be slid in and out of the frame 80 through the front opening.

Another type of rectangular rack is depicted in FIGS. 5 and 6. In this case, the horizontal rack elements 60B are stacked directly on top of each other as best shown in FIG. 6. Each rack element 60B has downwardly pointed corners 61 on its bottom side and corresponding downwardly directed recesses 63 on its top side, so that the rack elements 60B nest together with the pointed corners 61 of one rack element 60B fitting into the recesses 63 of the next lower rack element 60B. Thus, the rack elements 60B do not slide relative to each other when they are stacked together. In addition, the downwardly pointed corners act as legs or feet to separate the food (not shown) that is resting on the rack element 60B from the counter or table or other surface on which it is placed. As a result, potential contamination is reduced.

Figure 7:
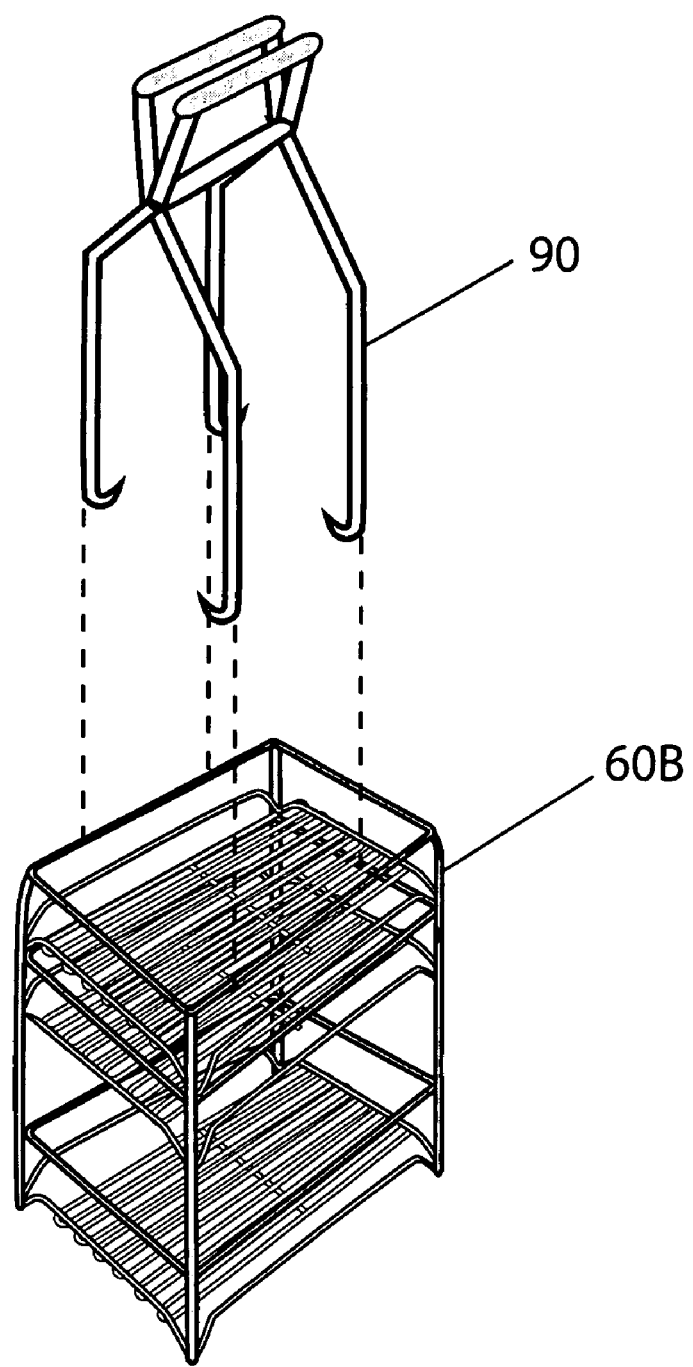
FIG. 7 a perspective view showing lifting tongs that can be used to lift the rack set of FIG. 5.

FIG. 7 depicts a pair of lifting tongs 90 that may be used to lift and transport the rectangular racks 60. Although the drawing shows the tongs being used to lift the stackable rack elements 60B, the tongs 90 may be used with other variations of the rectangular racks 60 as well. When used with the stackable rectangular rack elements 60B, the tongs 90 are used to grasp one of the rack elements 60B and then lift that rack element 60B as well as any rack elements above the rack element that is being grasped. As a result, the tongs 90 may be used to transport several rack elements 60B together, or it can transport one rack element 60B by itself.

It will be obvious to those skilled in the art that modifications may be made to the embodiments described above without departing from the scope of the present invention.

What is claimed is:

1. A pressure cooking vessel, comprising:
   (a) a housing defining a cylindrical chamber including a cylindrical chamber wall, a closed bottom; and an open top, said chamber wall defining a central vertical axis;
   (b) a lid, which encloses said open top;
   (c) at least one removable rack having a rectangular cross-section in the horizontal plane, said rack being received inside said cylindrical chamber;
   (d) at least one heating element positioned between said cylindrical tank wall and said central vertical axis; and
   (e) draining bars extending into said cylindrical chamber on opposite sides of said central vertical axis.

2. A pressure cooking vessel as recited in claim 1, wherein the center of said rectangular cross-section shares said central vertical axis.

3. A pressure cooking vessel as recited in claim 2, wherein said removable rectangular rack has two long opposing sides and two short opposing sides.

4. A pressure cooking vessel as recited in claim 3, wherein there are at least two heating elements in said chamber, one heating element positioned between each of said long sides of said rack and said cylindrical wall.

5. A pressure cooking vessel as recited in claim 1, wherein said rack includes a frame and plurality of horizontal rack elements received in said frame.

6. A pressure cooking vessel as recited in claim 1, wherein said rectangular rack includes a plurality of identical rack elements stacked on top of each other.

7. A pressure cooking vessel as recited in claim 6, and further comprising lifting tongs which include means for grasping said rack elements for lifting said rack elements out of said chamber.

8. A pressure cooking vessel, comprising:
   (a) a housing defining a cylindrical chamber including a cylindrical chamber wall, a closed bottom; and an open top, said chamber wall defining a central vertical axis;
   (b) a removable lid which encloses said open top; and
   (c) draining bars extending into said cylindrical chamber on opposing sides of said central vertical axis;
   (d) wherein said cylindrical wall and said draining bars define an internal cooking space having an elongated cross-section in the horizontal direction at least somewhere along said central vertical axis.

9. A pressure cooking vessel as recited in claim 8, further comprising electrical resistance heating elements, wherein said draining bars are positioned above said heating elements and below said open top.

10. A pressure cooking vessel as recited in claim 8, and further comprising at least one removable rectangular rack occupying said internal cooking space.

11. A pressure cooking vessel as recited in claim 10, wherein said rack includes a frame and plurality of horizontal rack elements received in said frame.

12. A pressure cooking vessel as recited in claim 10, wherein said rectangular rack includes a plurality of identical rack elements stacked on top of each other.

13. A pressure cooking vessel as recited in claim 12, and further comprising lifting tongs which include means for grasping said rack elements for lifting said rack elements out of said chamber.

14. A method of cooking food, comprising the steps of:
   placing food on a rack having a rectangular cross-section in the horizontal plane; then
   inserting said rack through the open top of a cylindrical pressure cooking vessel;
   then closing the top of said pressure cooking vessel;
   then heating said pressure cooking vessel, raising the internal pressure in said pressure cooking vessel to a pressure above the ambient, and cooking said food;
   then lifting said rack out of said vessel, rotating said rack 90 degrees; and
   lowering said rack onto a pair of opposed draining bars projecting inwardly into said cooking vessel.

15. A method of cooking food as recited in claim 14, and further comprising the step of carrying said rack of cooked food to a display area.

16. A method of cooking food as recited in claim 14, wherein the lifting of said rack is accomplished by a pair of tongs.

17. A method of cooking food as recited in claim 14, where said rack includes a frame and plurality of horizontal rack elements received in said frame.

18. A method of cooking food as recited in claim 14, where said rectangular rack includes a plurality of identical rack elements stacked on top of each other.

19. A method of cooking food as recited in claim 18, where the step of then lifting said rack out of said vessel is accomplished using lifting tongs which include means for grasping said rack elements.

* * * * *